(12) United States Patent  
Willamowski et al.

(10) Patent No.: US 8,879,103 B2  
(45) Date of Patent: Nov. 4, 2014

(54) SYSTEM AND METHOD FOR HIGHLIGHTING BARRIERS TO REDUCING PAPER USAGE

(71) Applicant: Xerox Corporation, Norwalk, CT (US)

(72) Inventors: Jutta Katharina Willamowski, Grenoble (FR); Guillaume M. Bouchard, St Martin le Vinoux (FR); Maria Antonietta Grasso, Grenoble (FR); Yves Hoppenot, Notre-Dame-de-Mesage (FR)

(73) Assignee: Xerox Corporation, Norwalk, CT (US)

( * ) Notice: Subject to any disclaimer, the term of this patent is extended or adjusted under 35 U.S.C. 154(b) by 51 days.

(21) Appl. No.: 13/783,650

(22) Filed: Mar. 4, 2013

(65) Prior Publication Data

US 2014/0247461 A1 Sep. 4, 2014

(51) Int. Cl.
*G06F 3/12* (2006.01)
*G06F 17/00* (2006.01)
*G06N 5/02* (2006.01)
*G06F 15/18* (2006.01)

(52) U.S. Cl.
CPC .................................... *G06F 3/1296* (2013.01)
USPC ................ 358/1.15; 706/46; 706/48; 706/61

(58) Field of Classification Search
CPC ...................................................... G06F 3/1219
See application file for complete search history.

(56) References Cited

U.S. PATENT DOCUMENTS

| | | | |
|---|---|---|---|
| 7,623,256 B2 | 11/2009 | Ciriza et al. | |
| 7,970,780 B2 * | 6/2011 | Hirahara | 707/758 |
| 2003/0021481 A1 | 1/2003 | Kasutani | |
| 2006/0206445 A1 | 9/2006 | Andreoli et al. | |
| 2007/0005356 A1 | 1/2007 | Perronnin | |
| 2007/0229873 A1 * | 10/2007 | Kato | 358/1.14 |
| 2007/0258648 A1 | 11/2007 | Perronnin | |
| 2008/0069456 A1 | 3/2008 | Perronnin | |
| 2008/0240572 A1 | 10/2008 | Hoshii | |
| 2008/0273224 A1 * | 11/2008 | Maulsby et al. | 358/1.15 |
| 2008/0288507 A1 * | 11/2008 | Nakagawa | 707/10 |
| 2008/0317358 A1 | 12/2008 | Bressan et al. | |
| 2009/0059279 A1 * | 3/2009 | Sakurai | 358/1.15 |

(Continued)

OTHER PUBLICATIONS

U.S. Appl. No. 13/774,020, filed Feb. 22, 2013, Lysak, et al.

(Continued)

*Primary Examiner* — King Poon
*Assistant Examiner* — Vincent Peren
(74) *Attorney, Agent, or Firm* — Fay Sharpe LLP

(57) ABSTRACT

A computer-implemented method for identifying constraints to reducing consumable usage includes acquiring print job information for a set of print jobs submitted for printing by a set of users. A print job representation is computed for each of the print jobs based on features extracted from the print job information. Provision is made for user-annotation of the submitted print jobs with a task category and a constraint category. Each of a plurality of task categories represents a respective task with which the printing of a print job is associated. Each of a plurality of selectable constraint categories expresses a different reason for printing the print job. User-annotations are received for at least some of the submitted print jobs. The print jobs are clustered into clusters based on the print job representations and task category annotations. A representation of the set of print jobs is generated which represents reasons for printing of print jobs in at least one of the clusters, based on the users' constraint category annotations.

23 Claims, 5 Drawing Sheets

(56) References Cited

U.S. PATENT DOCUMENTS

| | | |
|---|---|---|
| 2009/0144033 A1 | 6/2009 | Liu et al. |
| 2009/0147307 A1* | 6/2009 | Dietrich et al. ............... 358/1.15 |
| 2009/0208118 A1 | 8/2009 | Csurka |
| 2010/0040285 A1 | 2/2010 | Csurka et al. |
| 2010/0070521 A1 | 3/2010 | Clinchant et al. |
| 2010/0082615 A1 | 4/2010 | Clinchant et al. |
| 2010/0092084 A1 | 4/2010 | Perronnin et al. |
| 2010/0098343 A1 | 4/2010 | Perronnin et al. |
| 2010/0189354 A1 | 7/2010 | de Campos et al. |
| 2010/0191743 A1 | 7/2010 | Perronnin et al. |
| 2010/0226564 A1 | 9/2010 | Marchesotti et al. |
| 2010/0257141 A1 | 10/2010 | Monet et al. |
| 2010/0259780 A1* | 10/2010 | Shrader et al. ............... 358/1.15 |
| 2010/0274599 A1* | 10/2010 | DeRoller .......................... 705/7 |
| 2010/0312725 A1 | 12/2010 | Privault et al. |
| 2010/0318477 A1 | 12/2010 | Perronnin et al. |
| 2011/0026831 A1 | 2/2011 | Perronnin et al. |
| 2011/0037996 A1* | 2/2011 | DeRoller ..................... 358/1.15 |
| 2011/0040711 A1 | 2/2011 | Perronnin et al. |
| 2011/0052063 A1 | 3/2011 | McAuley et al. |
| 2011/0072012 A1 | 3/2011 | Ah-Pine et al. |
| 2011/0091105 A1 | 4/2011 | Perronnin |
| 2011/0137898 A1 | 6/2011 | Gordo et al. |
| 2011/0184950 A1 | 7/2011 | Skaff et al. |
| 2011/0273739 A1 | 11/2011 | Grasso et al. |
| 2012/0033250 A1 | 2/2012 | Grasso et al. |
| 2012/0045134 A1 | 2/2012 | Perronnin et al. |
| 2012/0076401 A1 | 3/2012 | Sanchez et al. |
| 2012/0143853 A1 | 6/2012 | Gordo et al. |
| 2012/0158739 A1 | 6/2012 | Ah-Pine et al. |
| 2013/0033723 A1* | 2/2013 | Lombardo et al. ........... 358/1.15 |

OTHER PUBLICATIONS

Perronnin, et al. "Large-scale image retrieval with compressed fisher vectors", Proc. of Computer Vision and Pattern Recognition, 2010, pp. 3384-3391.

Willamowski, et al. "The personal assessment tool: an experiment" Intl. Congress on Environmental Modeling and Software, Jul. 1-5, 2012, pp. 1-8.

O'Neill, et al. "When a little knowledge isn't a dangerous thing" Conf. on Human Factors in Computing Systems, May 7-12, 2011, pp. 1-10.

Lowe. "Distinctive image features from scale-invariant keypoints", IJCV, vol. 60, 2004, pp. 1-28.

Perronnin, et al. "Fisher kernels on visual vocabularies for image categorization" CVPR 2007, pp. 1-8.

Perronnin, et al. "Improving the fisher kernel for large-scale image classification", Proc. 11$^{th}$ European Conf. on Computer Vision, Part IV, 2010, pp. 143-156.

Sanchez, et al. "High-dimensional signature compression for large-scale image classification" CVPR 2011, pp. 1665-1672.

Lee. "Algorithms for nonnegative matrix factorization" Advances in Neural Information Processing Systems, 2001, 13:556-562.

Hofmann. "Unsupervised learning by probabilistic latent semantic analysis" Machine Learning, 2001,42(1/2):177-196.

Blei, et al. "Latent dirichiet allocation" J. Machine Learning Res., 2003, 3:993-1022.

* cited by examiner

SYSTEM AND METHOD FOR HIGHLIGHTING BARRIERS TO REDUCING PAPER USAGE

BACKGROUND

The exemplary embodiment relates to extraction of information from documents being processed and finds particular application in connection with a system and method for categorizing print jobs and inferring the motivation for printing them. This enables modifications to business processes to reduce paper usage.

In many contexts, such as the service industry, work is generally organized into processes that often entail printing documents. There is a growing trend towards replacing printing paper documents with digital counterparts, which may entail use of electronic signatures, email (instead of post mail) and online form filling. There are many reasons for this change, including higher productivity, cost-efficiency, and becoming more environmentally-friendly. Many large organizations are therefore looking for solutions to reduce paper usage and to move from using paper to digital documents. Unfortunately, especially in large organizations, it is often difficult to achieve this goal, because of a lack of information. Those in management, for example, often do not have a detailed understanding of where paper is being used by company employees, in particular, in which tasks or subtasks paper documents are generated, as well as how much paper is used in the process, in terms of the volume of paper being used in each of these tasks. Nor is there a good understanding of the reasons why paper is used for these tasks, i.e., what are the barriers that prevent using digital versions instead of paper documents within these tasks.

Having answers to these questions would help organizations to select which processes/tasks could be modified to facilitate moving them from paper to digital. However, without a good understanding of the paper consumption of the various tasks, and the reasons for printing documents, it is difficult to focus these efforts on the processes where changes would be the most effective.

The reasons for printing documents are often task dependent. Some common reasons involve requiring signatures, archiving, transitions between different computer systems, crossing organizational barriers, and so forth. However, there may be other reasons that have not been identified by the organization. To move from paper to digital, appropriate solutions may need to be implemented to replace the functions previously provided through generating paper documents, such as digital archiving, digital signatures, and the like. However, for some tasks, paper may afford benefits that digital documents do not provide. Paper is, for example, easy portable (e.g., when traveling), easy to read and annotate, and easy to hand over to another person. Employees could be provided with portable devices, such as eReaders, to address some of these issues, but this solution may not be cost-effective.

Currently, the transition from paper to digital is mainly achieved based on either ethnographic studies or consultancy: in these approaches typically an expert is sent to the site of the organization in order to study the existing work processes and to analyze these processes and the related tasks and constraints. In one study, management assumed that the paper consumption in the office was excessive and not really required for the work carried out by the employees. The extensive study carried out by ethnographers on site tended to disprove the assumption, but was time consuming to implement. See, Jacki O'Neill, David Martin, Tommaso Colombino, Antonietta Grasso, "A Little Knowledge is a Dangerous Thing?", CHI 2011—Conference on Human Factors in Computing Systems—Vancouver BC, Canada, May 2011.

There remains a need for a system and method for associating different tasks within an organization with corresponding paper usages and usage rationales, so that candidate solutions can be evaluated and implemented efficiently.

INCORPORATION BY REFERENCE

The following references, the disclosures of which are incorporated herein by reference in their entireties are mentioned:

U.S. Pub. No. 20120033250, published Feb. 9, 2012, entitled VIRTUAL PRINTING CURRENCY FOR PROMOTING ENVIRONMENTAL BEHAVIOR OF DEVICE USERS, by Maria Antonietta Grasso, et al.

U.S. Pub. No. 20100312725, published Dec. 9, 2010, entitled SYSTEM AND METHOD FOR ASSISTED DOCUMENT REVIEW, by Caroline Privault, et al.

U.S. Pub. No. 20100257141, published Oct. 7, 2010, entitled APPARATUS AND METHOD FOR DOCUMENT COLLECTION AND FILTERING, by Nicholas Monet, et al.

U.S. Pat. No. 7,623,256, issued Nov. 24, 2009, entitled AUTOMATED JOB REDIRECTION AND ORGANIZATION MANAGEMENT, by Victor Ciriza, et al.

U.S. Pub. No. 20060206445, published Sep. 14, 2006, entitled PROBABILISTIC MODELING OF SHARED DEVICE USAGE, by Jean-Marc Andreoli, et al.

U.S. application Ser. No. 13/774,020, filed Feb. 22, 2013, entitled USER PROFILING FOR ESTIMATING PRINTING PERFORMANCE, by Svetlana Lysak, et al.

BRIEF DESCRIPTION

In accordance with one aspect of the exemplary embodiment, a method for identifying constraints to reducing consumable usage includes acquiring print job information for a set of print jobs submitted for printing by a set of users, each print job comprising a document to be printed. A print job representation is computed for each of the print jobs based on features extracted from the print job information. Provision is made for user-annotation of the submitted print jobs with a task category and a constraint category, each of a plurality of selectable constraint categories expressing a different reason for printing the print job, each of a plurality of task categories representing a respective task with which the printing of a print job is associated. User-annotations are received for at least some of the submitted print jobs. The print jobs are clustered into clusters based on the print job representations and task category annotations. A representation of the set of print jobs is generated which represents reasons for printing of print jobs in at least one of the clusters, based on the users' constraint category annotations. At least one of the computing of the print job representation, providing for user-annotation, receiving user-annotations, clustering the print jobs, and generating of the representation of the set of print jobs may be performed with a computer processor.

In accordance with another aspect, a system for identifying constraints to reducing consumable usage includes a job tracking component for acquiring print job information for a set of print jobs submitted for printing by a set of users, each print job comprising a document to be printed. A features extractor computes a print job representation for each of the print jobs based on features extracted from the print job information. An annotation component receives user-annotations for at least some of the submitted print jobs. The user annotations include a task category and a constraint category. Each of a plurality of selectable constraint categories expresses a different reason for printing the print job. Each of a plurality of task categories represents a respective task with which the printing of a print job is associated. A clustering component clusters the print jobs into clusters based on the print job representations and task category annotations. An analysis component generates a representation of the set of print jobs which represents reasons for printing of print jobs in at least one of the clusters, based on the users' constraint category annotations. A processor implements the job tracking component, features extractor, annotation component, clustering component, and analysis component.

In accordance with another aspect, a method for identifying constraints on reducing consumable usage includes acquiring print job information for a set of print jobs submitted for printing by a set of users, each print job comprising a document to be printed. A print job representation is computed for each of the print jobs, based on features extracted from the print job information. The features include a statistical representation of low-level features extracted from patches of a page of the document. User-annotations for at least some of the submitted print jobs are received whereby submitted print jobs are annotated with a task category and a constraint category, each of a plurality of selectable constraint categories expressing a different reason for printing the print job, each of a plurality of task categories representing a respective task with which the printing of a print job is associated. The print jobs are partitioned into clusters based on the print job representations and task category annotations. A representation of the set of print jobs is generated which represents reasons for printing of print jobs in at least one of the clusters, based on the users' constraint category annotations. The computing of the print job representation, receiving user-annotations, partitioning the print jobs, and generating of the representation of the set of print jobs may be performed with a computer processor.

DETAILED DESCRIPTION

Figure 1:
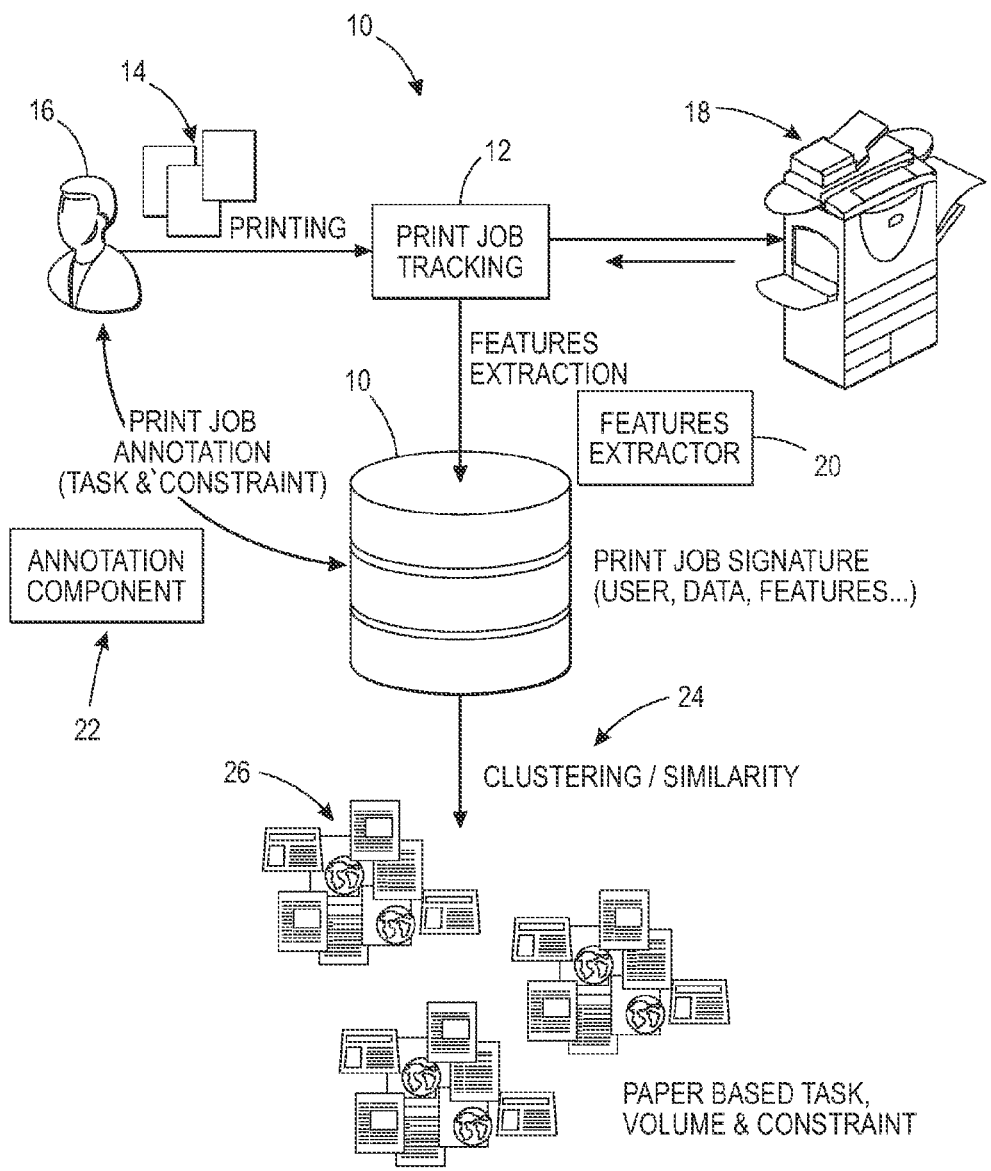
FIG. 1 is a graphical overview of a system and method for analyzing task-related printing.

A system and method are disclosed that analyze document printing in a way which enables informed decisions to be made by decision-makers, such as managers and other organization individuals, to support an effective move from printed paper to digital documents.

In embodiments disclosed herein, the exemplary method identifies recurring paper-based tasks by storing and analyzing print logs, estimates the impact of each task in terms of consumable usage, such as in terms of paper volume and/or power consumption, and identifies constraints that explain the reasons for printing, allowing identification of the barriers that prevent moving these tasks from paper to digital form.

A digital document includes one or more digital pages in electronic form. Document printing refers to the rendering of a digital document in hardcopy, e.g., paper form. Document printing may be quantified in terms of usage of one or more consumables employed in the output of printed documents.

Example consumables consumed in printing include print media, e.g., paper; marking materials, such as inks or toners; energy consumed by an output device, such as a printer, or the like in the rendering of a digital document in hardcopy, or a combination thereof. In the exemplary embodiment, usage of the consumable is quantified, at least in part, in terms of an amount of paper used in printing a document, such as a number of sheets of paper or a volume or weight of paper used (allowing different sizes and/or densities of the sheets to be accounted for), although other quantifiable measures may be employed, such as units of electric power consumed in printing (which may take into account that different printers/printing modes consume different amounts of energy), weight or volume of marking material (e.g., based on degree of coverage of each page, or an estimated average consumed per page), or by computing an overall cost per digital page printed, which may factor in type of print medium (e.g., bond vs. regular paper), whether monochrome or color printing is used, which of a plurality of printers is used in printing (where each printer has a different energy consumption), whether duplex or simplex printing is employed, or a combination of these and/or other factors directly or indirectly related to the quantity of one or more consumables used.

Each digital document can be in any convenient file format for printing, such as Word, PowerPoint, Spreadsheet, JPEG, Graphics Interchange Format (GIF), JBIG, Windows Bitmap Format (BMP), Tagged Image File Format (TIFF), JPEG File Interchange Format (JFIF), Delrin Winfax, PCX, Portable Network Graphics (PNG), DCX, G3, G4, G3 2D, Computer Aided Acquisition and Logistics Support Raster Format (GALS), Electronic Arts Interchange File Format (IFF), IOCA, PCD, IGF, ICO, Mixed Object Document Content Architecture (MO:DCA), Windows Metafile Format (WMF), ATT, BRK, CLP, LV, GX2, IMG(GEM), IMG(Xerox), IMT, KFX, FLE, MAC, MSP, NCR, Portable Bitmap (PBM), Portable Greymap (PGM), SUN, PNM, Portable Pixmap (PPM), Adobe Photoshop (PSD), Sun Rasterfile (RAS), SGI, X Bit-Map (XBM), X PixMap (XPM), X Window Dump (XWD), AFX, Imara, Exif, WordPerfect Graphics Metafile (WPG), Macintosh Picture (PICT), Encapsulated PostScript (EPS), combination thereof, or other common file format used for documents. In general, each page of the document may include one or more of text, raster graphics, and images, each image including image data, e.g., as an array of pixels.

A print job generally includes a printing object, which includes the digital document to be printed in a format recognized by the selected printer, e.g., Postscript, together with a job ticket, which provides information about the print job that will be used to control how the job is processed, such as number of copies, double or single sided printing, color or monochrome printing, paper type, specific printer selected, and so forth.

Print logs are records of print jobs that have been printed on a printer (or which are being sent for printing on a printer) and which contain information about the print jobs, such as the document name, user ID, image data for each page of the document, job ticket information, and so forth.

A task, as used herein, can be any function which entails generating a record of a document in at least one of digital and paper form and which is performed repeatedly by at least one and generally by multiple people within an organization. More particularly, in the exemplary embodiment, a task can be defined in terms of a cluster of similar documents, one or more of which may have been manually assigned a task label selected from a set of task labels. Document similarity can be determined based on one or more document features, as described in further detail below. The manually assigned task labels may be assigned by a user, such as a person who has selected a particular document for printing, or, in some cases, the user may be another person, who reviews the documents that have been printed or associated stored information, e.g., derived from the print logs.

The information generated in the exemplary method can assist management in taking appropriate and informed decisions, select the tasks that matter most in terms of consumable usage, and remove the corresponding barriers that prevented the move from paper to digital, for example, by investing in and modifying the organization's infrastructure and modifying business processes accordingly.

With reference to FIG. 1, an overview of an exemplary print analysis system 10 and method is shown. The exemplary system 10 tracks users' print jobs and computes features for some or all of them. It then combines document clustering and user annotations of print jobs to provide information about paper based tasks, the consumables they represent, and the reasons why they are required in paper format.

The system 10 includes a print job tracking component 12 that intercepts print jobs 14 that are sent by different users 16 within the organization to a printing infrastructure 18 (and/or which receives information on the print jobs from the printing infrastructure, such as print logs). The number of users and print jobs is not limited but may include at least 2 or at least 5, or at least 10 and up to 100 or more users, each generating one or more print jobs for printing on the printing infrastructure 18, for example, over a selected time period, such as a day, week, month, or the like. In the exemplary embodiment, the number of print jobs may be at least 10, or at least 100, or up to 1000 or more.

A features extractor 20 extracts and computes for each individual print job, a print job representation (or "signature") comprising a set of feature descriptors (such as a user ID, a printing date and time, a document title, a document length, visual and/or textual document content-based features, or a combination thereof). The print job signature can be a vectorial representation of information extracted from the print job.

An annotation component 22 provides for users 16 to annotate at least some of the print jobs 14 with: a) a task label specifying a task and/or subtask to which the printed document belongs, and/or b) a constraint category which relates to the constraints (reasons or barriers) as to why the corresponding document was considered beneficial to be printed or was required to be in paper rather than simply digital format.

A clustering component 24 identifies clusters 26 of similar print jobs 14. The clustering is based on the assumption that similar print jobs will belong to similar tasks and that users have work roles corresponding to a specific subset of tasks and thus print essentially the corresponding types of print jobs. Thus, print jobs which have no annotations can be clustered based on the similarity of their print job signatures to those of annotated jobs.

Figure 2:
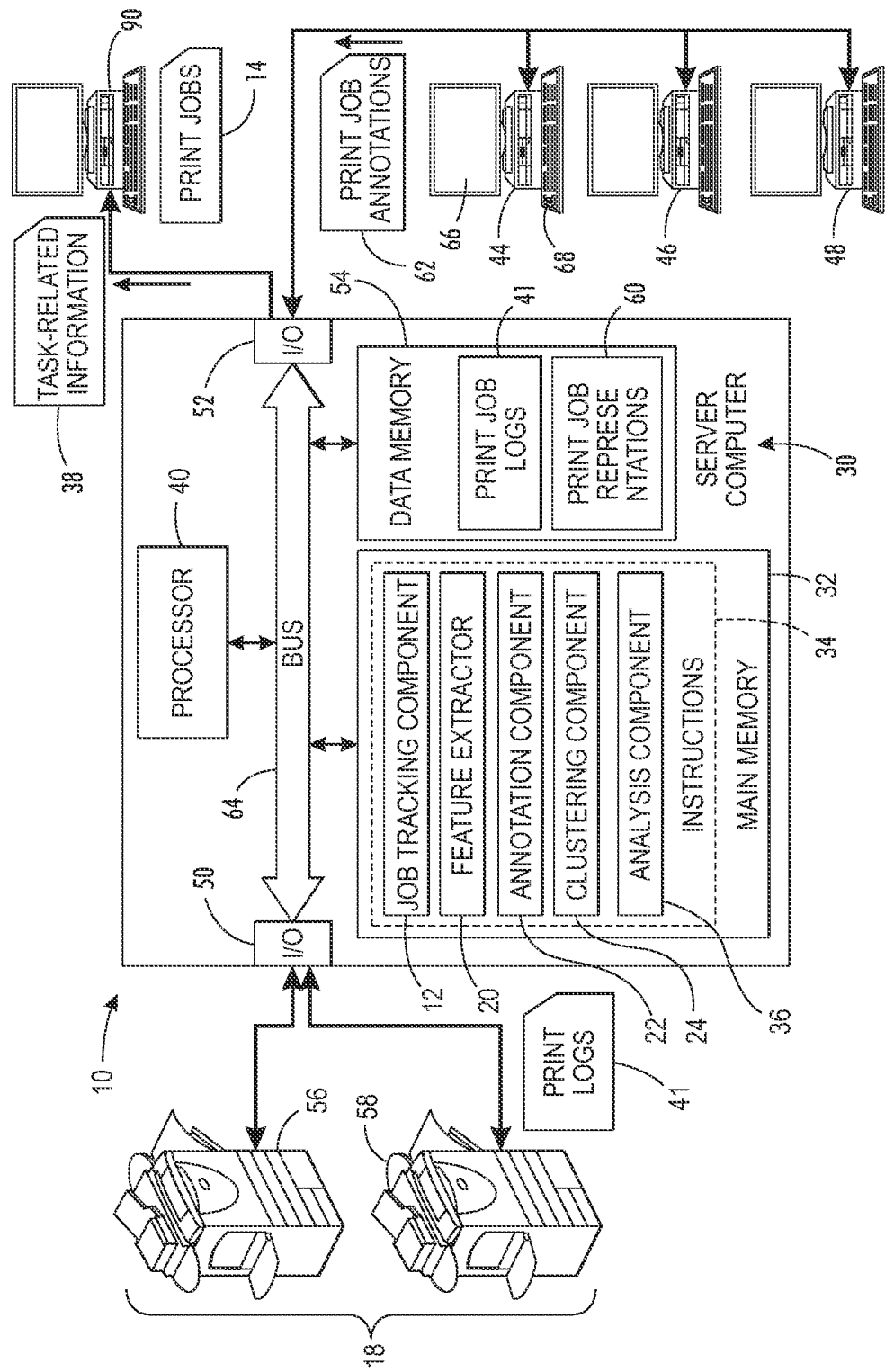
FIG. 2 is functional block diagram of a system for analyzing task-related printing in accordance with one aspect of the exemplary embodiment.

As illustrated in FIG. 2, the system 10 may suitably be hosted by one or more computing devices 30. For example, the system 10 includes main memory 32 which stores instructions 34 for performing the exemplary method, including the print job tracking component 12, features extractor 20, annotation component 22, and clustering component 24, described above with reference to FIG. 1.

An analysis component 36 generates task-related information 38, based on the clustering and annotations, which is output from the system 10. In the exemplary embodiment, the components 12, 20, 22, 26, 36 are in the form of software which is implemented by a computer processor 40 in communication with memory 32.

In the illustrated embodiment, the computing device 30 receives print job information comprising print jobs 14, and/or information extracted therefrom, such as print logs 41, via a network 42. In one embodiment the print jobs 14 are received by the job tracking component 12 from a plurality of client computing devices 44, 46, 48 linked to the network 42, that are used by the respective users 16 to generate print jobs. However, it is to be appreciated that print job information for the submitted print jobs 14 may alternatively or additionally be received from the printing infrastructure 18 or from a print job server (not shown), which distributes the print jobs 14 to the various printers in printing infrastructure 18. The print job information 14, 41 is received by the system 10 via one or more input/output (I/O) interfaces 50, 52 and stored in data memory 54 of the system 10 during processing. The computing device 30 also may control the distribution of the received print jobs 14 to respective printers 56, 58 of the printing infrastructure 18, or this function may be performed by another computer on the network.

The feature extractor 20 extracts features from the print job information. The extracted features are used to generate a representation 60 of each print job, which may be stored in memory 54.

The annotation component 22 receives, as input, print job annotations 62 for at least some of the print jobs 14, via the network, e.g., from the client computing devices 44, 46, 48 and stores the annotations, or information extracted from them, in memory 22. The annotations may include task-related information and/or information on constraints which limit or prevent the user's ability to use a digital version of the printed document rather than printing a paper copy. The task-related information may include a task category selected from a plurality of task categories, or information from which the task category may be inferred. The constraint-related information may include a constraint category selected from a plurality of constraint categories, or information from which the constraint category may be inferred.

The clustering component 24 is trained, on the annotated (labeled) print jobs and is then able to cluster a set of labeled and unlabeled print jobs into a plurality of clusters 26. Hardware components 32, 40, 50, 52, 54 may communicate via a data/control bus 64. The processor 40 executes the instructions for performing the method outlined in FIG. 3.

The client devices 44, 46, 48 may each communicate with one or more of a display 66, for displaying information to users, and a user input device 68, such as a keyboard or touch or writable screen, a cursor control device, such as mouse or trackball, a speech to text converter, or the like, for inputting text and for communicating user input information and command selections to the respective computer processor and to processor 40 via network.

The computer device 30 may be a PC, such as a server computer, a desktop, laptop, tablet, or palmtop computer, a portable digital assistant (PDA), a cellular telephone, a pager, combination thereof, or other computing device capable of executing instructions for performing the exemplary method.

The memory 32, 54 may represent any type of non-transitory computer readable medium such as random access memory (RAM), read only memory (ROM), magnetic disk or tape, optical disk, flash memory, or holographic memory. In one embodiment, the memory 32, 54 comprises a combination of random access memory and read only memory. In some embodiments, the processor 40 and memory 32 may be combined in a single chip. The network interface 50, 52 allows the computer 30 to communicate with other devices via a computer network 42, such as a local area network (LAN) or wide area network (WAN), or the internet, and may comprise a modulator/demodulator (MODEM) a router, a cable, and/or Ethernet port. Memory 32, 54 stores instructions for performing the exemplary method as well as the processed data 38.

The digital processor 40 can be variously embodied, such as by a single-core processor, a dual-core processor (or more generally by a multiple-core processor), a digital processor and cooperating math coprocessor, a digital controller, or the like. The exemplary digital processor 40, in addition to controlling the operation of the computer 30, executes instructions stored in memory 34 for performing the method outlined in FIG. 3.

The client devices 44, 46, 48 may be configured as for computing device 30, except as noted.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 10. Since the configuration and operation of programmable computers are well known, they will not be described further.

Figure 3:
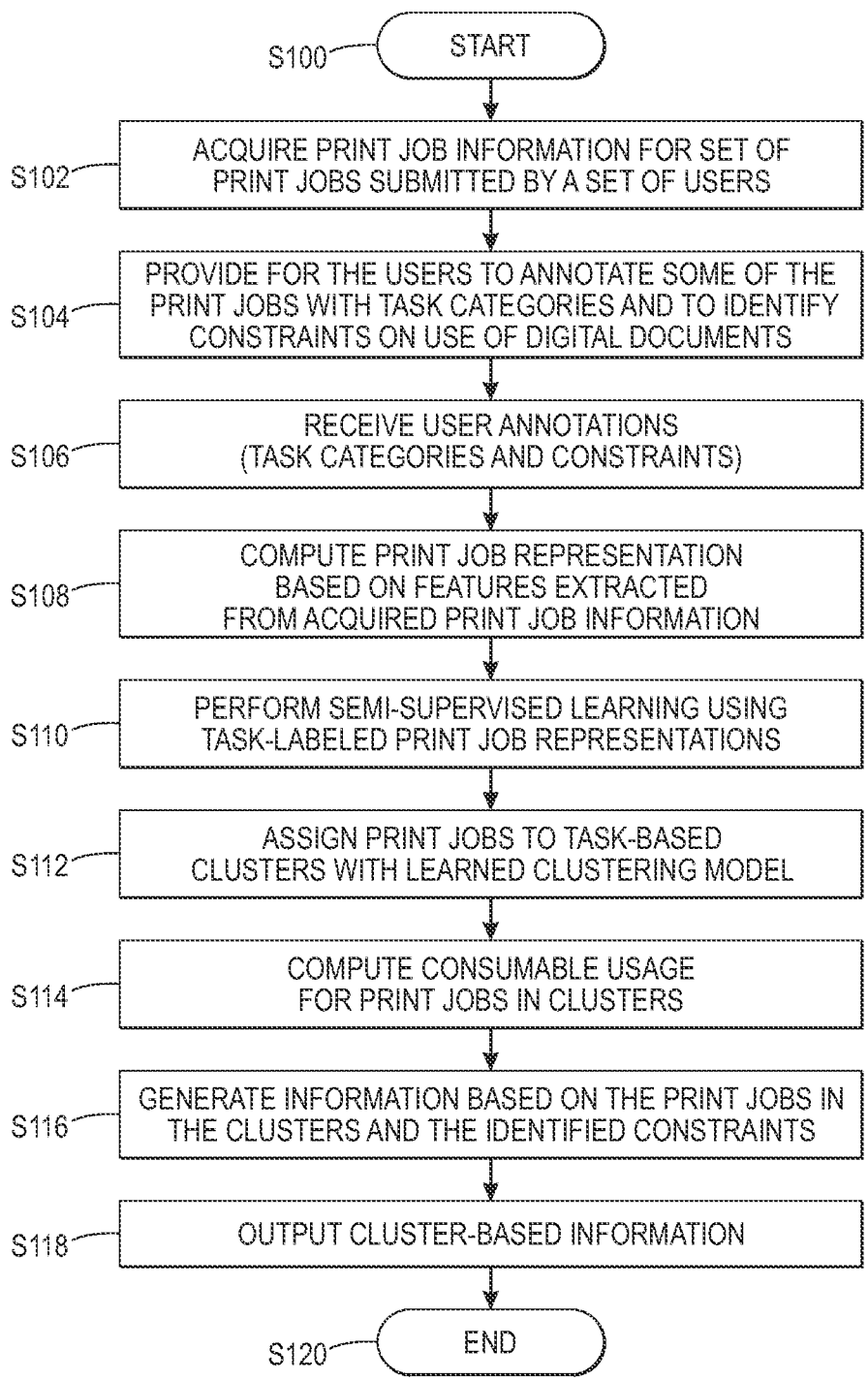
FIG. 3 is flow chart of a system for analyzing task-related printing in accordance with another aspect of the exemplary embodiment.

With reference to FIG. 3, a method for analysis of the reasons for printing print jobs is shown, which can be performed with the system of FIG. 2. The method begins at S100.

At S102, print job information 14, 41 is acquired for a collection of print jobs generated by a set of users 16, such as company employees, and stored in computer memory 54.

At S104 provision is made for the employees 16 to annotate their print jobs according to task categories, e.g., via a graphical user interface generated on the user's client device 44, 46, or 48. In one embodiment, the task categories may be limited to a predefined set of task categories (labels). In another embodiment, users may be permitted to add new task categories. The annotations may also include a constraint which explains why the printing of the job was needed or beneficial. The constraint may be selected from a set of constraint categories. In another embodiment, users may be permitted to add new constraint categories.

At S106, user annotations 60 are received by the system 10 and stored in memory.

At S108, for each of a set of the print jobs, a print job representation 6260 is generated, which includes features extracted from the print job information received at S102.

At S110, semi-supervised learning is performed, based on print job feature representations and respective task-annotation labels to assign task-labeled print jobs to clusters and generate parameters of a clustering model for assigning unlabeled print jobs to task-related clusters 26.

At S112, unlabeled documents are assigned to clusters based on their document feature representations. This propagates the document annotation (task and constraint category) labels to the unlabeled documents. Each unlabeled print job may be assigned to a single cluster or probabilistically over all clusters. In one embodiment, the set of print jobs is partitioned among the clusters such that no print job is assigned to more than one cluster.

At S114, consumable usage is computed, by the analysis component 36, for the print jobs in the clusters. In one embodiment, the number of pages in each print job in the set of submitted jobs is stored in memory and for each cluster, the total number of print job pages is computed for the print jobs assigned to that cluster. For each cluster, the number of pages is computed for each constraint category, based on the distribution of the annotated print jobs in that cluster over the set of possible constraint categories.

At S116, cluster-based information is generated based on the clusters, such as a representation of the constraints and/or features for the print jobs assigned to a cluster.

At S118, the cluster-based information 38 is output.

The method ends at S120.

The method may be repeated at intervals, for example, when new task categories or constraint categories are added.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively or additionally, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method. As will be appreciated, while the steps of the method may all be computer implemented, in some embodiments one or more of the steps may be at least partially performed manually.

Further details of the system and method will now be described.

Print Job Tracking (S102)

Print job tracking systems that provide the basic functionality of the exemplary print job tracking component 12, such as intercepting print jobs issued through a print infrastructure 18 and extracting the corresponding user name, document title, document length, and similar information are readily available. For example, a device management program, such as the Xerox Device Manager (XDM), accessible through Xerox CentreWareWeb™, can be installed in a printer network. Such a monitoring system 12 is able to mine information regarding print jobs as well as to intercept data to be printed and to store it in the form of a PDF/PS file.

The functionality of such a system can be enhanced with instructions to compute additional features, such as visual or textual document content and/or layout from the print jobs that will also allow taking into account the layout and content of the printed documents. This can be performed by rendering the page description language (PDL) document and then applying OCR or visual feature extraction to one or more of the rendered document pages. The features extracted can then be used in computing a word-based, or image feature based representation of the document page. Other features can be based on color or black & white pixels coverage which helps to estimate the type of document: drawing, text or graphics. These representations, or features extracted therefrom, can serve as features of the print job representation.

Feature Extraction (S108)

Exemplary features used in clustering the print jobs can be selected from:

1. User ID, such as the user name of the user submitting the print job for printing.
2. Print job submission time.
3. Document title, which may be extracted from the filepath of the document.
4. Document length, which may be expressed in terms of a number of sheets in the job being printed.
3. Print job type selected from a predefined set of job types (e.g., selected from Email; spreadsheet, such as Excel; graphics; PDF; PowerPoint; RTF; Text; drawing program, such as Visio or Chemdraw; Web page; Word, other).
4. Textual content features, such as word frequencies of each of a selected set of words, extracted from the title and/or content of the printed document.
5. Visual content features, such as features based on color and/or gradient of pixels of patches of a document page image.
6. Coverage features, such as the number/proportion of pixels which are "on" (having a color) or the number/proportion of pixels of each of the color separations (e.g., C, M, Y, and optionally K).

In some embodiments, at least two, or at least three, or at least four, or all of these feature types is extracted for each print job. Some of the features may be generated by the job tracking component, as discussed above. Other features may be extracted by the feature extractor. The feature values acquired by the job tracking component, and/or feature extractor, may each be normalized to a common range of values, such as 0-1. The print job representation as a whole may also be normalized so the values sum to 1, or some other normalization is performed. Some of the features may be weighted, in the print job representation, to reflect their relative importance, although the clustering component may also learn which features are most important for clustering the jobs and weight them accordingly.

For generating print job type features, each print job type may be a separate feature in the representation and a value of 1 can be accorded if the job is of that type, 0 otherwise.

For extracting a document title from a filepath, the document title may be taken from the last forward slash to the final period. In other embodiments, the title may be stored as metadata, or in other information associated with the document. The identified document title may be split into words and a histogram representation generated of the words that it contains. The histogram may represent a limited set of words, such as those expected to be found in document titles, and may exclude stop words which are too frequent to be discriminative.

Methods for extracting features from text are described, for example, in U.S. Pub. No. 20100070521, published Mar. 18, 2010, entitled QUERY TRANSLATION THROUGH DICTIONARY ADAPTATION, and U.S. Pub. No. 20100082615, published Apr. 1, 2010, entitled CROSS-MEDIA SIMILARITY MEASURES THROUGH TRANS-MEDIA PSEUDO-RELEVANCE FEEDBACK AND DOCUMENT RERANKING, both by Stephane Clinchant, et al., the disclosures of which are incorporated herein by reference in their entireties. The representation can be a bag-of-words representation which is based on the number of occurrences of each of a set of words in the document page or set of pages.

For generation of an image representation of one or more pages of the document to be printed, the feature extractor may generate any suitable high level statistical representation of an image constituted by the document page or part thereof, such as a multidimensional vector generated based on features extracted from the image. Fisher Kernel representations and Bag-of-Visual-Word representations are exemplary of suitable high-level statistical representations which can be used herein. The exemplary representations are of a fixed dimensionality, i.e., each image signature has the same number of elements.

For example, the feature extractor 20 includes a patch extractor, which extracts and analyzes low level visual features of patches of the image, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image.

The extracted low level features (in the form of a local descriptor, such as a vector or histogram) from each patch can be concatenated and optionally reduced in dimensionality, to form a features vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, etc.), characteristic background (e.g., starlit sky, blue sky, grass field, snow, beach, etc.), or the like. Given an image to be assigned a representation, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image representation or input to a generative model which outputs an image representation based thereon.

For example, as local descriptors extracted from the patches, SIFT descriptors or other gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for each of the channels (e.g., three: R, G and B, in the case of color documents, or a single channel in the case of monochrome images). These are merely illustrative examples, and additional and/or other features can be used. The number of features in each local descriptor is optionally reduced, e.g., to 64 dimensions, using Principal Component Analysis (PCA). Signatures can be computed for two or more regions of the image and aggregated, e.g., concatenated.

In some illustrative examples, a Fisher vector is computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described in U.S. Pub. No. 20120045134, published Feb. 23, 2012 entitled LARGE SCALE IMAGE CLASSIFICATION, by Florent Perronnin, et al., and U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al., and in Jorge Sanchez, and Thomas Mensink, "Improving the fisher kernel for large-scale image classification," in Proc. 11$^{th}$ European Conference on Computer Vision (ECCV): Part IV, pages 143-156 (2010); Perronnin, F. and Liu, Y. and Sanchez, J. and Poirier, H., "Large-scale image retrieval with compressed fisher vectors," in Proc. of Computer Vision and Pattern Recognition (CVPR), pp. 3384-3391, 2010; and Jorge Sanchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, different types of document pages, including images, text, emails, and the like).

Other methods of generating image representations which can be used as features herein are described in U.S. Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853, and 20120158739, the disclosures of which are incorporated herein by reference in their entireties.

Annotation of Print Jobs (S104, S106)

At S104, a predefined set of task categories may be presented to the user for selection, such as three, four or more tasks, e.g., {administrative, intellectual property, presentation, personal, forms, email, other}. In one embodiment, the set of task categories may be arranged in a hierarchy such that one or more of the categories corresponds to a sub-task of another task. The user is also presented with a set of constraint categories, which express the reasons why the document is/was to be printed. The set of constraints may include two, three, four or more constraints from which the user can select one (or in some embodiments, more than one constraint). The tasks and constraints selected by the user serve as category labels for the respective documents.

In the exemplary embodiment, fewer than all of the print jobs in the set are annotated with task-labels and/or constraint labels. In some embodiments, a user may be permitted/chose to apply a task label but no constraint label, or vice versa. In other embodiments, the user may be required to/choose to apply both a task label and constraint label when annotating a print job.

The annotation can be made easy for the employees. For example, annotation may form a part of their recognized usual activity, or they may be provided with an incentive to annotate print jobs (such as an increase in their printing quota). In some embodiments, annotating documents allows them to access a more informative visualization of their printing history, e.g., through a Personal Assessment Tool (PAT), as described in copending U.S. Pub. Nos. 20110273739 and 20120033250 and U.S. application Ser. No. 13/774,020, filed Feb. 22, 2013, the disclosures of which are incorporated herein by reference in their entireties.

Various procedures for annotation are contemplated which can be used individually or in combination. For example, the annotation process can be initiated spontaneously by the users or when requested by the system, for example, to use active learning in order to validate or refine the actual clustering. Users may annotate one (or a set of) selected print job(s), thereby associating it to a corresponding one of a set of tasks and identifying constraints on printing. In another embodiment, the user may annotate a point in time or time frame with the task they were mainly performing at that time (e.g., reviewing papers for a conference, preparing for a customer visit, etc.) and the system identifies print jobs submitted during that time frame and associates them with that task.

In one embodiment, users can provide annotations when submitting print jobs. In this case, the annotations may be integrated into the existing printing selection process, e.g., within one of the already existing notification pop-up windows informing the user that his print job has been sent to or processed by the printer. In one study, it was shown that at least a significant portion of users would have been motivated to do so to pinpoint paper-based processes that should evolve to digital form (e.g., legal documents or forms requiring a signature).

Users can also provide annotations of print jobs or time frames at a later time from a print history view. In one embodiment, a graphical user interface which provides a Personal Assessment Tool (PAT), as described above, provides a print history view visualizing the user's print jobs over time. For example, the print history provides the document title and length. In addition, users may be provided with access to the visual document content, i.e. the document page images. From this information, users can associate a set of print jobs to the task to which they belong. Alternatively, users can specify a time frame and associate it to one or a set of tasks or to a particular event generating associated tasks. This indicates that the print jobs they initiated in this time frame correspond to the tasks they were primarily executing in that time frame.

It has been found that it is relatively easy to motivate at least a minimum number of users to participate in the annotation effort. Experiments with systems like the Personal Assessment Tool indicate that people will often be willing to provide annotation even if they will not gain any particular benefits for themselves. Also, the annotations provide the users with a method to make their work and barriers explicit to the management, which constitutes another incentive to annotate. It has been found that some people are annoyed about having to print documents and are therefore willing to provide spontaneous feedback about the nature of the print job and the reasons for submitting it.

In some embodiments, a reward may be provided to users who provide user-annotations for at least some of their respective submitted print jobs. For example, the system may motivate users to participate in the annotation effort by giving them a better or more detailed feedback about their printing behavior in relation to their participation in the annotation of print jobs. In one embodiment, users may initially be provided with only a basic breakdown of their print jobs, e.g., according to the applications used to launch them (or no breakdown at all), whereas once they have annotated a minimum number of print jobs, they are provided with a more detailed breakdown of their jobs according to corresponding identified tasks, optionally together with annotated constraints for paper usage. With an increasing number of annotations, this information may be displayed in more and more detail. In addition, the system may provide participating users with access to complementary information extracted from their print jobs and involved in the clustering, such as the most frequent words observed in the user's print jobs' document titles. The incentive for the user is to provide a limited amount of annotations to a community of users that will be used by the system to improve and refine the overall clustering and getting in return the benefit from all the annotations provided by the whole community of users. To encourage the user to provide even more annotations, the system may provide an incrementally improving breakdown. This means that to motivate the user, the system initially displays only a limited breakdown of information to the user, even if it could provide quite detailed information based on other users' prior annotations. The level of detail may thus increase with the number and value of the annotations provided.

In other embodiments, the users may be provided with one or more additional or alternative rewards, such as a cash payment, an increase in their print allocation, or other tangible or intangible rewards, as discussed, for example, in U.S. Pub. Nos. 20110273739 and 20120033250.

In the context of the PAT system, one suitable occasion to ask users to annotate some of their typical print jobs is during the self-assessment step: this is when users are reviewing their printing habits and will thus be naturally more inclined to provide annotations.

Figure 4:
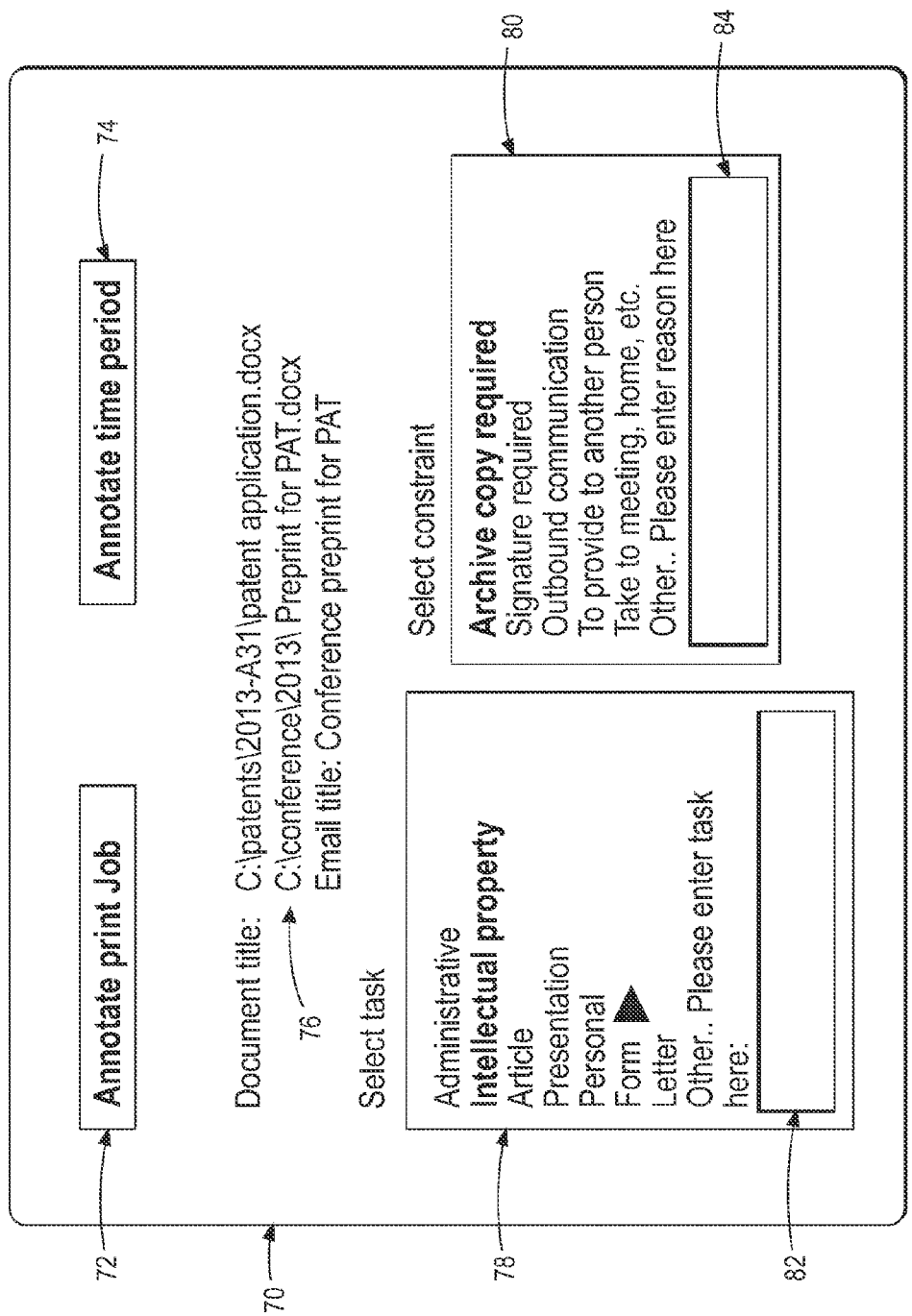
FIG. 4 illustrates a graphical user interface for user-annotation of print jobs.

FIG. 4 illustrates an example graphical user interface (GUI) 70, which may be presented to a user on the display device 66 of a client device 44, 46, 48 for annotating a print job. The GUI allows the use to select a specific document or a time frame, using appropriate active areas 72, 74 of the screen. Assuming that the user has clicked on "Annotate Print Job" 72, the system may then display a list 76 of documents from which the user may select one or more to annotate. In the example, the user has selected to annotate the first document. A task area 78 provides a list of tasks from which the user selects "intellectual property" as the task category. The system then labels the particular print job selected with this task category. The GUI also lists reasons for printing the document on paper in a constraint area 80. Both areas 78, 80 can be organized either as a simple list, e.g., as a drop down menu, or as a hierarchy allowing users to be more or less specific in their annotation, letting them provide as detailed information as they are prepared to. In some embodiments, the user may be free to provide a non-listed task and/or constraint reason by typing in a free text box 82, 84.

The initial hierarchy for tasks and/or constraint categories may be established by the person managing the transition effort from paper to digital from the basic understanding of the various employees' tasks. In the illustrated embodiment, users have the ability to manually add a new category when none of the others seems appropriate (or to select the category "other"). An initial example for task categories could be: [article, presentation, letter, form, other]. Each of these categories can then in turn be further specified into sub-categories, e.g., the different types of forms. Over time, users may add additional task categories, such as "Personal." An example set of constraint categories (which may be broken down into barriers and reasons) could be: barriers [signature, archiving, outbound communication, other], reasons [mobility, reading comfort, note taking, handing over to third person, other].

As users are able to add new task/constraint categories when annotating, an additional effort may be undertaken to keep the corresponding categories sound and meaningful. This can be taken care of by one of the persons managing the paper-transition effort. This coordinator is charged with the task of coordinating and controlling the established task/constraint categories, interacting and clarifying, if appropriate, with the users who have added them to the system. For example, when a user enters a new task (or constraint) category in the "other" free text box, a message is sent to the coordinator, e.g., to a client device 90. The message may be presented in a coordinator GUI, on which the coordinator reviews the new task (or constraint), decides whether it should be added as a new category to the list that is presented to other users or whether is already encompassed by one of the existing task (or constraint) categories. If it is accepted by the coordinator as a new task (or constraint) to be added as a new task (or constraint) category, the system 10 is notified of the new task (or constraint) category, and the clustering component 24 then takes the new category into consideration in the cluster learning (or re-learning) and assignment steps S110, S112.

Print Job Clustering (S110, S112)

The features extracted from the print jobs, such as the visual features associated to each print job, enable them to be automatically grouped into clusters. Each cluster can be considered as corresponding to a different task category. This helps to detect documents involved in the same process or task, since they are often associated with documents of similar structure. For example, it may be expected that documents associated with organizing travel (plane e-tickets, hotel reservations, travel map, etc.) or with the filing of intellectual property documents (invention disclosure, patent applications, copyright forms, publications) may occur more frequently in some groups than others. Recent development in document clustering techniques show that it is possible to deal with millions of documents using compressed image signatures, with no loss of accuracy compared to a precise description of the images. See, for example, Perronnin, F. and Liu, Y. and Sanchez, J. and Poirier, H., "Large-scale image retrieval with compressed fisher vectors," in Proc. Computer Vision and Pattern Recognition (CVPR), pp. 3384-3391, 2010.

Based on features that are extracted for each document and the subset of annotated documents, the annotation component 22 of the system learns clustering parameters for a set of clusters and propagates the labels to all the documents which have not yet been labeled. This may be performed using a supervised learning technique based on existing labels or a semi-supervised learning method. Exemplary methods for clustering are described, for example, in Seeger, M., "Learning with labelled and unlabelled data," (Technical Report), University of Edinburgh (2001), and Zhu, Xiaojin, John Lafferty, and Ronald Rosenfeld, "Semi-supervised learning with graphs," Diss. Carnegie Mellon University, Language Technologies Institute, School of Computer Science, 2005.

Example clustering algorithms which may be used herein include Nonnegative Matrix Factorization (NMF), Probabilistic Latent Semantic Analysis (PLSA), and Latent Dirichlet Allocation (LDA). See, for example, Lee, "Algorithms for nonnegative matrix factorization," Advances in Neural Information Processing Systems, 13:556-562, 2001; Hofmann, "Unsupervised learning by probabilistic latent semantic analysis," Machine Learning, 42(1/2):177-196, 2001; and Blei, et al., "Latent dirichlet allocation," J. Machine Learning Res., 3:993-1022, 2003, for a discussion of these techniques.

As an example, in PLSA, a mixture model may be used in which the probability of a print job representation w given a label u is expressed as a sum over a set of classes z of the probability of the representation given a class and the probability of the class, given a label:

$$P_{LSA}(w|u) = \Sigma_z P(w|z;\theta) P(z|u;\pi)$$

where $\theta$ and $\pi$ (and optionally also the number N of clusters) are parameters to be learned, e.g., via log-likelihood maximization which optimizes the values of the parameters. This can be approximated by expectation maximization. In the expectation step, the probability that the occurrence of representation w with label u can be explained by cluster z is computed given current values of the parameters.

$$P(z|u, w) = \frac{P(z|u;\pi) P(w|z;\theta)}{\sum_{z'} P(z'|u;\pi) P(w|z';\theta)}$$

In the maximization step, the parameters are re-estimated, based on the probabilities computed in the expectation step.

$$P(w|z,\theta) \propto \Sigma_u n(u,w) P(z|d,w),$$

where n(u,w)P(z|d,w) represents how often representation w is associated with class z, and $$P(z|u,\pi) \propto \Sigma_w n(u,w) P(z|u,w)$$

where n(u,w)P(z|u, w) represents how often label u is associated with class z.

The two steps are iterated until convergence or until a stopping criterion is met.

The number of clusters may be predefined, e.g., in terms of an exact number of clusters or in terms of a maximum and/or minimum number of clusters. In other embodiments, the clustering algorithm is permitted to select an optimum number of clusters.

In the supervised case, the task labels as well as the print job representations are used in initial learning of the cluster parameters. In the semi-supervised case, the print jobs may be clustered based solely on the print job representations. The task labels are then used to refine the clusters, e.g., by merging two clusters which have print jobs having the same task labels.

Note that in this specific application, the goal of the clustering is to obtain clusters corresponding to print job tasks, but not to categories specific to the document content itself, since it is unlikely that the content will reoccur frequently. However, the structure of the document is often characteristic of a task that is repeated over time. It has been found that for some applications, a visual signature, based on image features, may be a more useful feature than the other suggested features for grouping documents, such as the time of printing, the user ID, or the OCR output containing the actual words of a document. For example, the distribution of the words of two patents may be very different if they are on different topics, but the visual signatures may be fairly similar, due to similar graphic elements, font types, shapes and sizes of text blocks, and shapes in the figures. It has been found that evaluating how many print jobs are actual patents, travel request forms, and financial reports is informative about the paper-intensive processes that occur in the company.

In one exemplary embodiment, the labeled print job data can be used to identify parameters of clusters for the clustering model, which is then used to assign unlabeled print jobs to clusters based on their extracted features.

In another embodiment, the print job clustering system produces clusters of similar print jobs, initially roughly grouping, for example, print jobs related to similar basic types of documents, e.g. forms, letters, emails, presentations, etc. These initial clusters can then be refined, validated and associated to the corresponding tasks using the labels or other information input from the users who issued the jobs. Crowd sourcing information from the users, lets them annotate a small portion of their print jobs indicating to which task they correspond and also why the document was required to be in paper form. The system then uses the collected information to improve the clustering and this process can iterate until the results obtained are consistent. This approach has the advantage of requiring only a limited number of annotations and thus only a limited number of users annotating their jobs. The number of annotations needed may depend on the number of different tasks within the organization, the variability of corresponding documents involved, and on the quality of the clustering mechanism.

Once the clustering parameters are learned, unlabeled print jobs can be automatically assigned to clusters based on their print job representations alone (S112).

Consumable Usage (S114)

In computing the amount of consumable used in a given task, the analysis component 36 of the system may compute the sum of the sheets of paper used or pages printed in both the task-labeled and the unlabeled print jobs in a respective cluster. As will be appreciated, other methods may be used for computing consumable usage which take into account a number of factors may be used, as described, for example in U.S. Pub. No. 20120033250. In computing the amount of consumable associated with a given constraint, the analysis component 36 of the system may compute, for each of the set of constraints, the sum of sheets/printed pages in the print jobs in a given cluster which have been labeled with that constraint. The analysis component may infer that the unlabeled print jobs in the cluster would have the same constraint distribution as the labeled print jobs, in order to provide an amount of the consumable for each constraint for the entire set of labeled and unlabeled print jobs in the cluster.

Information Presentation (S116, S118)

Figure 5:
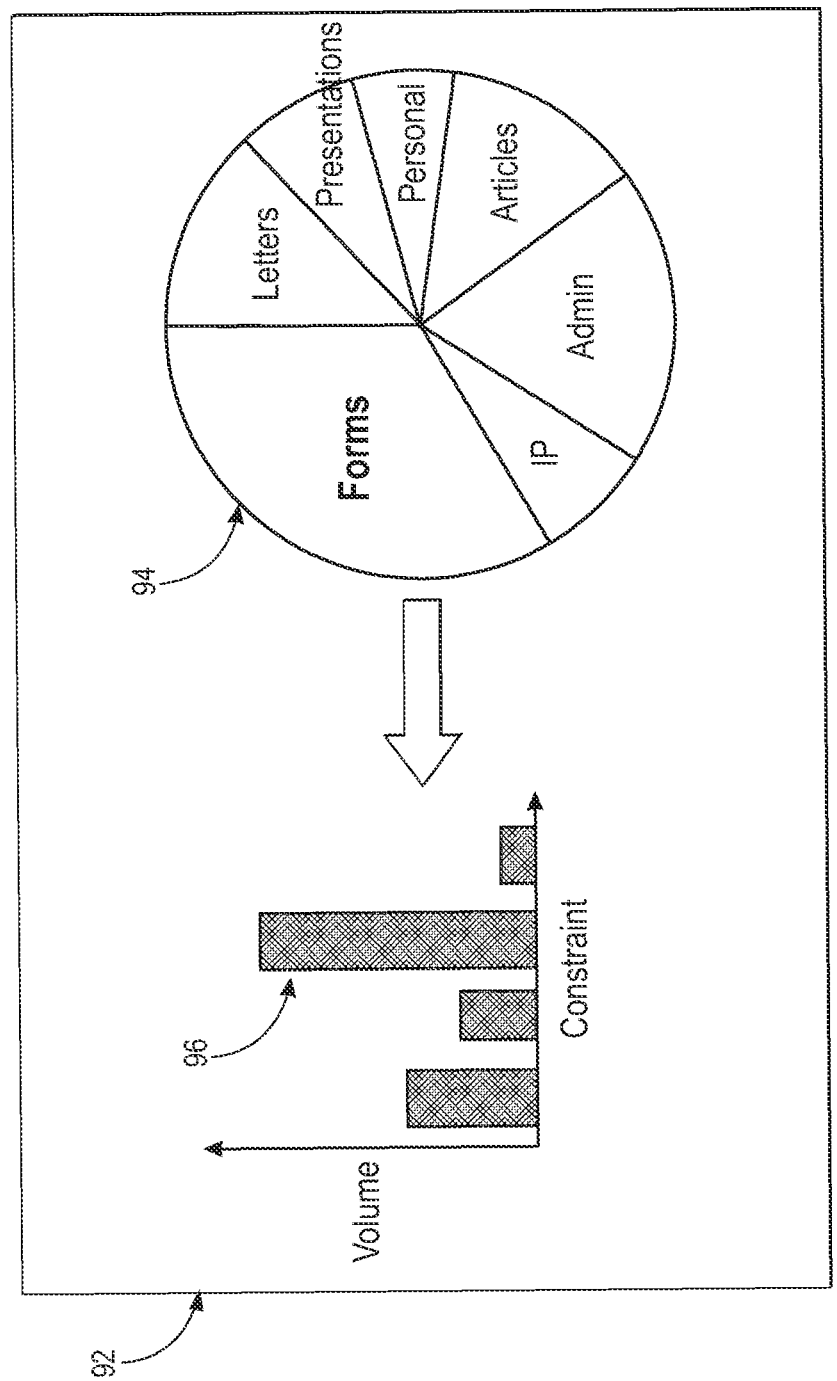
FIG. 5 illustrates a graphical user interface for display to a coordinator.

The clusters generated can be used by the analysis component to generate task related information 38. As illustrated in FIG. 5, in one embodiment, the task related information includes a representation 92 of the set of print jobs, which represents reasons for printing of print jobs in at least one of the clusters, based on the users' constraint category annotations. The set representation 92 may represent the types of tasks and constraints on printing in any suitable format useful to the coordinator and/or to company management.

In visualization of the clusters, the manager may access a summary of the results (textual summary or graphical elements). The visualization may also be provided through histograms/time plots as in the Personal Assessment Tool.

In one embodiment of the set representation 92, the coordinator may be presented with a representation 94 of the task categories and a representation 96 of the constraint categories for a user-selected one of the task categories (extracted from the corresponding cluster). The representations 94, 96 may take the form of a list, a histogram, a pie chart, or any other suitable visual representation.

In on embodiment, the representation 92 of the set of print jobs associates the consumable usage (computed at S114) with the reasons for printing, based on the constraint annotations provided by the users at S104. For example, the coordinator may be presented with a representation 94 of the total amount of a consumable(s) associated with a given task. In this embodiment, the analysis component 36 sums the number of pages in all print jobs in each cluster over a given period of time, such as a day, week, month, etc. and represents these in a form which allows the coordinator to determine the most paper-consuming (or other consumable) tasks.

In one embodiment, the coordinator may be able to review the clusters and access print job documents within a selected cluster.

Given such information in human-readable form, the coordinator is able to determine what tasks contribute most to paper usage (or other consumable) and the most common reasons for printing those jobs. The coordinator, manager, or other person, may then take actions based on the results, such as by proposing modification to business processes which are provided to management for review and, if approved, for subsequent implementation by the collection of users.

As will be appreciated, the representation 92 may be generated, at least in part, by the coordinator, using the information output by the system 10.

The system and method described herein thus provide an approach to highlight barriers to moving from paper to digital format. This approach combines print job tracking, feature extraction and clustering with user annotation of the print jobs, where users annotate print jobs with information about the task to which they belong and why they have been printed on paper, i.e. why the corresponding task is paper-based and not digital. A benefit of this approach is that it is then easy to detect document types and reasons for printing which create substantial paper volume.

While the exemplary embodiment is directed to a print job workflow in which the print jobs are generated at work stations, scanning and/or fax print job workflows can be similarly annotated. Annotation can be done at the scan/fax devices or afterwards, through the exemplary graphical user interface 70. Combining printing and scanning/faxing workflows may provide more information about paper workflow.

Further, the system and method can be used to evaluate and measure the process of the transition from paper to digital. For example, the change in the clusters over time and the constraints of the annotated print jobs in the clusters can be monitored. This allows the implementation of a paper-reduction procedure to be evaluated. The evaluation may include for first and second sets of the print jobs submitted in respective different time periods, acquiring print job information, computing print job representations, providing for and receiving user-annotations, clustering the print jobs, and generating of a representation of the set of print jobs, and comparing the representation for the second set of print jobs with the representation for the first set of print jobs. For example, the method may be used to determine whether the paper-usage corresponding to a specific task decreases once eReader solutions have been put in place.

The exemplary system and method profit from the willingness of print job submitters to annotate the documents, which is complemented with print job clustering and additional crowd sourced annotation as needed to complete the understanding of the tasks, the corresponding print jobs and the motivations for printing.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for identifying constraints on reducing consumable usage comprising:
   acquiring print job information for a set of print jobs submitted for printing by a set of users, each print job comprising a document to be printed;
   computing a print job representation for each of the print jobs based on features extracted from the print job information;
   providing for user-annotation of the submitted print jobs with a task category and a constraint category, each of a plurality of task categories representing a respective task with which the printing of a print job is associated, each of a plurality of selectable constraint categories expressing a different reason for printing the print job, wherein at least one of:
   a) the providing for user-annotation of the submitted print jobs with a task category comprises providing for the user to select a task category from a predefined set of categories and wherein the user is permitted to propose a new task category for adding to the set of task categories, and
   b) the providing for user-annotation of the submitted print jobs with a constraint category comprises providing for the user to propose a new constraint category for adding to the plurality of constraint categories;
   receiving user-annotations for at least some of the submitted print jobs;
   clustering the print jobs into clusters based on the print job representations and task category annotations; and
   generating a representation of the set of print jobs which represents reasons for printing of print jobs in at least one of the clusters, based on the users' constraint category annotations,
   wherein at least one of the computing of the print job representation, providing for user-annotation, receiving user-annotations, clustering the print jobs, and generating of the representation of the set of print jobs is performed with a computer processor.

2. The method of claim 1, further comprising computing consumable usage for the print jobs in the at least one of the clusters.

3. The method of claim 2, wherein the representation associates the consumable usage with the reasons for printing.

4. The method of claim 2, wherein the consumable usage is based on at least one of a number of pages printed and a number of sheets printed in each print job.

5. The method of claim 1, wherein when the user proposes a new task category for adding to the set of task categories, the proposed new task category is submitted to a coordinator for review before adding the proposed new task category to the set of task categories.

6. The method of claim 1, wherein the computing of the print job representation for each of the print jobs based on features extracted from the print job information comprises extracting features selected from the group consisting of:
user ID;
print job submission time;
document title;
document length;
print job type;
textual content features;
visual content features; and
page coverage features.

7. The method of claim 6, wherein the features comprise textual features, the computing of the print job representation comprising words from the print job and generating a statistical representation of the print job based on the extracted words.

8. The method of claim 1, wherein the constraints include constraints selected from the group consisting of signature requirement, archiving, outbound communication, mobility, reading comfort, note taking, handing over to third person, and other.

9. The method of claim 1, wherein the generating of the representation of the set of print jobs comprises generating a graphical representation.

10. The method of claim 1, wherein the acquiring print job information for a set of print jobs submitted for printing comprises acquiring print logs from a plurality of printers for the submitted print jobs.

11. The method of claim 1, wherein the receiving user-annotations for at least some of the submitted print jobs comprises receiving task category annotations for fewer than all of the print jobs in the set, the clustering comprising assigning print jobs without a task category annotation to a respective cluster based on the respective print job representation.

12. A computer program product comprising a non-transitory recording medium storing instructions which, when executed by a computer processor, perform the method of claim 1.

13. A system comprising memory which stores instructions for performing the method of claim 1 and a processor in communication with the memory which implements the instructions.

14. A method for identifying constraints on reducing consumable usage comprising:
acquiring print job information for a set of print jobs submitted for printing by a set of users, each print job comprising a document to be printed;
computing a print job representation for each of the print jobs based on features extracted from the print job information, wherein the features comprise at least one of visual content features and textual content features,
wherein when the extracted features comprise visual content features, the computing of the print job representation comprises extracting low-level features from patches of a page of the document of the print job and generating a statistical representation of the page based on the extracted low-level features, and
wherein when the extracted features comprise textual features, the computing of the print job representation comprises extracting words from the print job and generating a statistical representation of the print job based on the extracted words;
providing for user-annotation of the submitted print jobs with a task category and a constraint category, each of a plurality of task categories representing a respective task with which the printing of a print job is associated, each of a plurality of selectable constraint categories expressing a different reason for printing the print job;
receiving user-annotations for at least some of the submitted print jobs;
clustering the print jobs into clusters based on the print job representations and task category annotations; and
generating a representation of the set of print jobs which represents reasons for printing of print jobs in at least one of the clusters, based on the users' constraint category annotations,
wherein at least one of the computing of the print job representation, providing for user-annotation, receiving user-annotations, clustering the print jobs, and generating of the representation of the set of print jobs is performed with a computer processor.

15. The method of claim 14, wherein the providing for user-annotation of the submitted print jobs with a task category comprises providing for the user to select a task category from a predefined set of categories.

16. The method of claim 15, wherein a user is permitted to propose a new task category for adding to the set of task categories.

17. The method of claim 14, wherein the providing for user-annotation of the submitted print jobs with a constraint category comprises providing for the user to propose a new constraint category for adding to the plurality of constraint categories.

18. The method of claim 17, wherein the proposed new constraint category is submitted to a coordinator for review before adding the proposed new constraint category to the plurality of constraint categories.

19. A method for identifying constraints on reducing consumable usage comprising:
acquiring print job information for a set of print jobs submitted for printing by a set of users, each print job comprising a document to be printed;
computing a print job representation for each of the print jobs based on features extracted from the print job information;
providing for user-annotation of the submitted print jobs with a task category and a constraint category, each of a plurality of task categories representing a respective task with which the printing of a print job is associated, each of a plurality of selectable constraint categories expressing a different reason for printing the print job;
receiving user-annotations for at least some of the submitted print jobs;
clustering the print jobs into clusters based on the print job representations and task category annotations;
generating a representation of the set of print jobs which represents reasons for printing of print jobs in at least one of the clusters, based on the users' constraint category annotations; and
evaluating a transition from paper to digital documents, comprising:

for first and second sets of the print jobs, performing the acquiring print job information, computing of the print job representation, providing for user-annotation, receiving user-annotations, clustering the print jobs, and generating of the representation of the set of print jobs, and comparing the representation for the second set of print jobs with the representation for the first set of print jobs, wherein at least one of the computing of the print job representation, providing for user-annotation, receiving user-annotations, clustering the print jobs, and generating of the representation of the set of print jobs is performed with a computer processor.

20. The method of claim 19, wherein the information for the second set of print jobs is acquired for print jobs submitted after submission of the first set of print jobs.

21. A method for identifying constraints on reducing consumable usage comprising:

acquiring print job information for a set of print jobs submitted for printing by a set of users, each print job comprising a document to be printed;

computing a print job representation for each of the print jobs based on features extracted from the print job information;

providing for user-annotation of the submitted print jobs with a task category and a constraint category, each of a plurality of task categories representing a respective task with which the printing of a print job is associated, each of a plurality of selectable constraint categories expressing a different reason for printing the print job;

receiving user-annotations for at least some of the submitted print jobs;

clustering the print jobs into clusters based on the print job representations and task category annotations;

generating a representation of the set of print jobs which represents reasons for printing of print jobs in at least one of the clusters, based on the users' constraint category annotations; and providing a reward to users who provide user-annotations for at least some of their respective submitted print jobs, wherein at least one of the computing of the print job representation, providing for user-annotation, receiving user-annotations, clustering the print jobs, and generating of the representation of the set of print lobs is performed with a computer processor.

22. A system for identifying constraints on reducing consumable usage comprising:

a job tracking component for acquiring print job information for a set of print jobs submitted for printing by a set of users, each print job comprising a document to be printed;

a features extractor for computing a print job representation for each of the print jobs based on features extracted from the print job information;

an annotation component for receiving user-annotations for at least some of the submitted print jobs, the user user-annotations comprising a task category and a constraint category, each of a plurality of task categories representing a respective task with which the printing of a print job is associated, each of a plurality of selectable constraint categories expressing a different reason for printing the print job;

a clustering component for clustering the print jobs into clusters based on the print job representations and task category annotations, wherein when the received user-annotations comprise task category annotations for fewer than all of the submitted print jobs, the clustering component assigns submitted print jobs without a task category annotation to a respective cluster based on the respective print job representation;

an analysis component for generating a representation of the set of print jobs which represents reasons for printing of print jobs in at least one of the clusters, based on the users' constraint category annotations; and a processor which implements the job tracking component, features extractor, annotation component, clustering component, and analysis component.

23. A method for identifying constraints on reducing consumable usage comprising:

acquiring print job information for a set of print jobs submitted for printing by a set of users, each print job comprising a document to be printed;

computing a print job representation for each of the print jobs based on features extracted from the print job information, the features including a statistical representation of low-level features extracted from patches of a page of the document;

receiving user-annotations for at least some of the submitted print jobs whereby submitted print jobs are annotated with a task category and a constraint category, each of a plurality of task categories representing a respective task with which the printing of a print job is associated, each of a plurality of selectable constraint categories expressing a different reason for printing the print job;

partitioning the print jobs into clusters based on the print job representations and task category annotations; and generating a representation of the set of print jobs which represents reasons for printing of print jobs in at least one of the clusters, based on the users' constraint category annotations, wherein the computing of the print job representation, receiving user-annotations, partitioning the print jobs, and generating of the representation of the set of print jobs are performed with a computer processor.

* * * * *